United States Patent
Schoenfisch et al.

(10) Patent No.: US 9,675,994 B2
(45) Date of Patent: Jun. 13, 2017

(54) SUPERHYDROPHOBIC COATINGS AND METHODS FOR THEIR PREPARATION

(75) Inventors: Mark H. Schoenfisch, Chapel Hill, NC (US); Ben Privett, Siler City, NC (US); Jae Ho Shin, Seoul (KR); Jonghae Youn, Gyeonggi-do (KR)

(73) Assignees: The University of North Carolina at Chapel Hill, Chapel Hill, NC (US); Kwangwoon University Industry-Academic Collaboration Foundation, Seoul (KR)

( * ) Notice: Subject to any disclaimer, the term of this patent is extended or adjusted under 35 U.S.C. 154(b) by 248 days.

(21) Appl. No.: 14/122,378

(22) PCT Filed: Jun. 1, 2012

(86) PCT No.: PCT/US2012/040374
§ 371 (c)(1),
(2), (4) Date: May 14, 2014

(87) PCT Pub. No.: WO2012/167017
PCT Pub. Date: Dec. 6, 2012

(65) Prior Publication Data
US 2014/0238263 A1    Aug. 28, 2014

Related U.S. Application Data

(60) Provisional application No. 61/492,108, filed on Jun. 1, 2011.

(51) Int. Cl.
*B05D 1/02* (2006.01)
*C01B 33/12* (2006.01)
(Continued)

(52) U.S. Cl.
CPC .............. *B05D 1/02* (2013.01); *C01B 33/128* (2013.01); *C01B 33/142* (2013.01); *C01B 33/143* (2013.01); *C09D 1/00* (2013.01)

(58) Field of Classification Search
None
See application file for complete search history.

(56) References Cited

U.S. PATENT DOCUMENTS 5,800,926 A * 9/1998 Nogami .................. C03C 17/42
                                                                427/168
6,506,496 B1   1/2003 Frugier et al.
(Continued)

FOREIGN PATENT DOCUMENTS

WO   WO 00/58410 A1   10/2000
WO   WO 2004/106252 A1   12/2004
WO   WO 2010/002859 A2   1/2010

OTHER PUBLICATIONS

Teshima et al.; Transparent Ultra Water-Repellent poly(ethylene terepthalate) Substrates Fabricated by Oxygen Plasma Treatment and Subsequent Hydrophobic Coating; Applied Surface Sciences; 244 (2005) 619-622.*

(Continued)

*Primary Examiner* — Michael P Rodriguez
(74) *Attorney, Agent, or Firm* — Alston & Bird LLP

(57) ABSTRACT

Superhydrophobic coatings and compositions and methods for preparing superhydrophobic coatings and compositions are described herein whereby the coatings and compositions are prepared under mild conditions, yet the methods are amenable to chemical functionalization of the coatings and components therein. The methods are useful for tuning and optimizing the physical properties of the coatings. In an embodiment, the coatings comprise nanostructured fluorinated silica colloids.

13 Claims, 18 Drawing Sheets

(51) Int. Cl.
*C01B 33/142* (2006.01)
*C01B 33/143* (2006.01)
*C09D 1/00* (2006.01)

(56) References Cited

U.S. PATENT DOCUMENTS

| | | | |
|---|---|---|---|
| 2002/0150723 A1 | 10/2002 | Oles et al. | |
| 2003/0108716 A1 | 6/2003 | Nun et al. | |
| 2005/0136252 A1* | 6/2005 | Chisholm | C09D 4/00 |
| | | | 428/352 |
| 2009/0275826 A1* | 11/2009 | Enzerink | B32B 3/26 |
| | | | 600/424 |

OTHER PUBLICATIONS

Hikita et al.; Super-Liquid-Repellent Surfaces Prepared by Colloidal Silica Nanoparticles Covered with Fluoroalkyl Groups; Langmuir; 2005, 21, 7299-7302.*

Privett, B., et al., "Antibacterial Fluorinated Silica Colloid Superhydrophobic Surfaces," *Langmuir*, 2011, vol. 27, pp. 9597-9601.

Bravo, J., et al., "Transparent Superhydrophobic Films Based on Silica Nanoparticles," *Langmuir*, 2007, pp. 7293-7298, vol. 23.

Fresnais, J., et al., "Plasma-Treated Superhydrophobic Polythylene Surfaces: Fabrication, Wetting and Dewetting Properties," *Journal of Adhesion Science and Technology*, 2009, pp. 447-467, vol. 23.

Furstner, R., et al., "Wetting and Self-Cleaning Properties of Artificial Superhydrophobic Surfaces," *Langmuir*, 2005, pp. 956-961, vol. 21.

Hikita, M., et al., "Super-Liquid-Repellent Surfaces Prepared by Colloidal Silica Nanoparticles Covered with Fluoroalkyl Group," *Langmuir*, 2005, pp. 7299-7302, vol. 21.

Hwang, H. S., et al., "Facile Fabrication of Transparent Superhydrophobic Surfaces by Spray Deposition," *ACS Applied Materials & Interfaces*, 2011, pp. 2179-2183, vol. 3.

Li, X., et al., "What do we need for a superhydrophobic surface? A review on the recent progress in the preparation of superhydrophobic surfaces," *Chemical Society Reviews*, 2007, p. 1529, vol. 36.

Yang, H. and P. Jiang, "Self-Cleaning Diffractive Macroporous Films by Doctor Blade Coating," *Langmuir*, 2010, pp. 12598-12604, vol. 26.

* cited by examiner

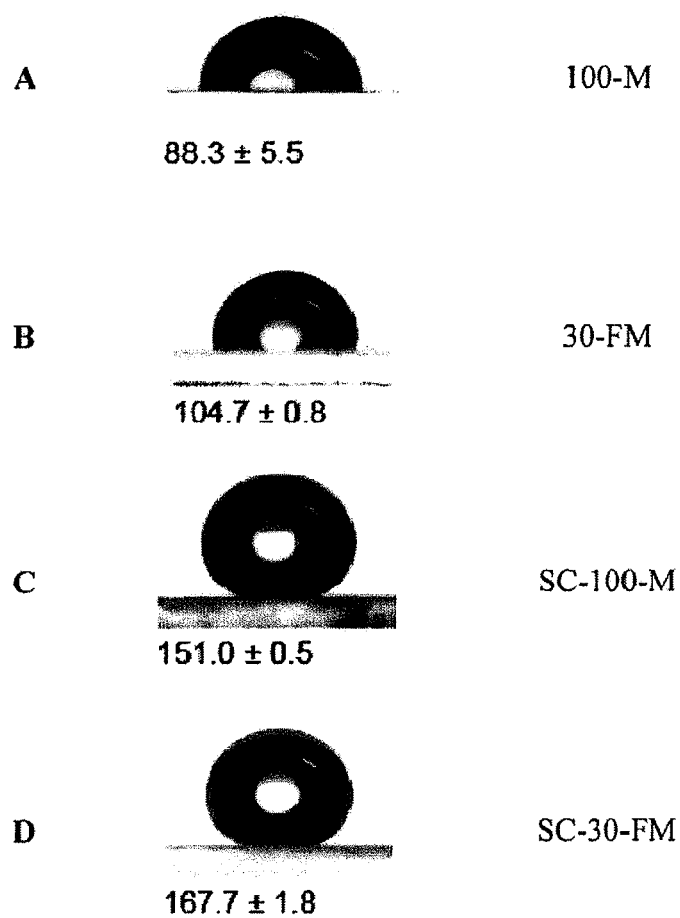
Figures 2A-D

* Indicates statistically significant difference ($p$-value < 0.05).

Water static contact angle: 167.73 ± 1.98

A
<14 nm>
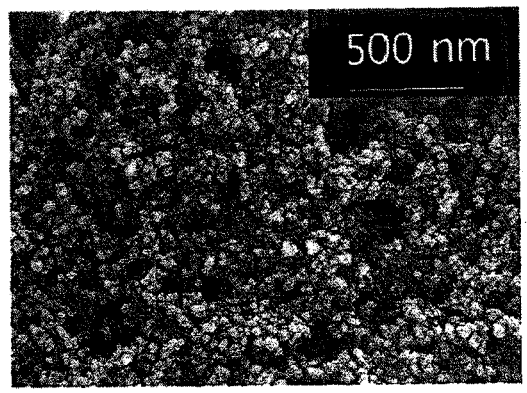
B
<100 nm>
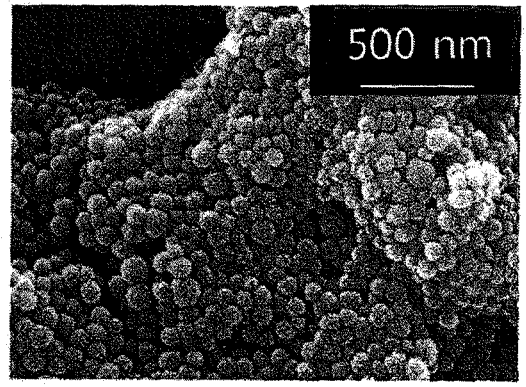
C
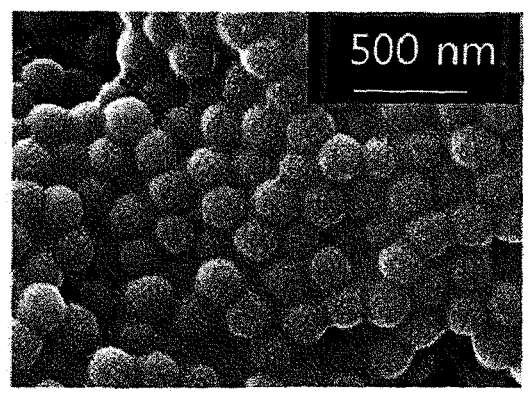
<200 nm>
Figure 12

A 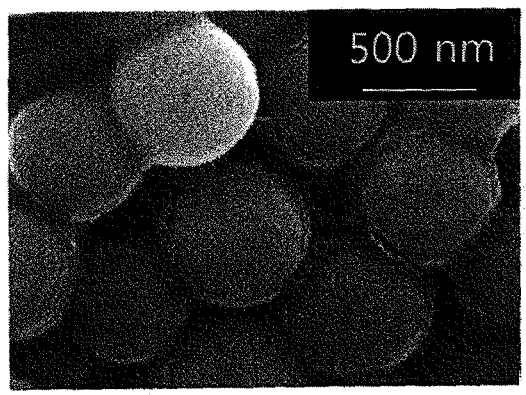
<500 nm>
B 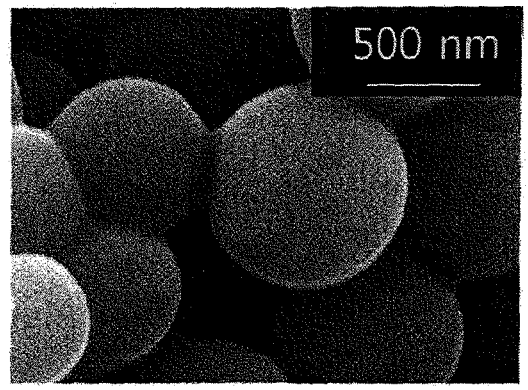
<1000 nm>
Figure 13

| Substrate | Static water contact angle (degrees) | |  |
|---|---|---|---|
|  | Before coating | After coating |  |
| Paper | -- | 169.0 ± 1.6 | 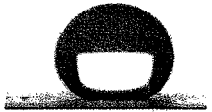 |
| Ceramic plate | 69.5 ± 0.7 | 168.3 ± 0.6 |  |
| Fabric | -- | 168.7 ± 1.4 |  |
| Aluminum plate | 96.9 ± 1.8 | 176.6 ± 0.4 |  |
| Polyethylene terephthalate plate | 71.4 ± 0.8 | 168.3 ± 0.9 |  |
Particle size: 500 nm
Figure 18

SUPERHYDROPHOBIC COATINGS AND METHODS FOR THEIR PREPARATION

CROSS-REFERENCE TO RELATED APPLICATIONS

This application is the U.S. National Stage of International Application PCT/US2012/040374, filed Jun. 1, 2012, which designates the U.S. and was published by the International Bureau in English on Dec. 6, 2012, and which claims the benefit of U.S. Provisional Application No. 61/492,108, filed Jun. 1, 2011, both of which are hereby incorporated by reference in their entirety.

STATEMENT REGARDING FEDERALLY SPONSORED RESEARCH OR DEVELOPMENT

This invention was made with United States government support awarded by the National Institutes of Health under grant no. 5-R01-EB000708-06-08. The United States government has certain rights in this invention.

FIELD OF THE INVENTION

The subject matter disclosed herein relates generally to superhydrophobic coatings and methods of preparing superhydrophobic coatings under mild conditions.

BACKGROUND

Hydrophobic surfaces can be used to improve the liquid repellence of a product and/or stain resistance of the product. Products with surfaces which resist absorbing liquids can have a number of commercially beneficial features. Such features can include liquid repellent materials and/or liquid resistant finishes, self-cleaning finishes and/or finishes that have a self cleaning effect and/or stain resistance finishes. The mechanisms associated with liquid repellency and liquid adhesion are in part related to the surface-energy acting between the liquid and the surface in contact with the liquid. When the free surface energy between the surface and liquid is low, there is generally a weak bond or adhesion between the liquid and surface. In such situations, the liquid has a greater tendency to run off the surface and/or be adsorbed at a slower rate by the surface. As such, on such surfaces liquids tend to runoff non-flat surfaces and/or bead on flatter surfaces.

Hydrophobic materials are commonly used to form hydrophobic surfaces. Such materials include waxes, fluorinated polymers, silicones, and the like. These materials are used in vehicle waxes and/or cleaners, tire cleaners, leather polishes and/or cleaners, floor polishes and/or cleaners, etc. For instance, silicones, siloxanes and various fluoro-acrylate polymers are the predominant materials used in fabric water proofing formulations and have been used for many years to protect fabrics from moisture penetration. These formulations are generally sprayed topically onto a fabric surface, and after air curing or drying, provide effective water repellency to rain, moisture, as well as protection against various soils and stains.

Another mechanism for forming hydrophobic surfaces is by altering the topology of the surface of a material. It has been found that elevations or depressions having certain heights and separated by certain distances can create hydrophobic surfaces. These types of surfaces can result in droplet formation of liquids. This principle is borrowed from nature and specifically from the lotus plant. It is known that small contact surfaces can reduce Van der Waals interaction, which is in part responsible for adhesion to flat surfaces with low surface energy. The leaves of the lotus plant have elevations made from a wax, and these elevations tend to lower the contact area with water. Several patent applications disclose the use of these artificially formed elevations on various types of surfaces such as US 2002/0150723; US 2003/0108716 and WO 00/58410, all of which are incorporated herein by reference.

The fabrication of synthetic superhydrophobic surfaces typically involves surface modification resulting in nanoscale surface roughness (i.e., nanoparticles, photolithography, mesoporous polymers, surface etching), sometimes in conjunction with chemical modification to reduce surface energy. (Li, X. M.; Reinhoudt, D.; Crego-Calama, M. *Chem. Soc. Rev.,* 2007, 36, 1529-1529). These materials often require harsh synthetic conditions (e.g., etching and high temperature) (Fresnais, J.; Chapel, J. P.; Benyahia, L.; Poncin-Epaillard, F. *J Adhes. Sci. Technol.,* 2009, 23, 447-467; Hikita, M.; Tanaka, K.; Nakamura, T.; Kajiyama, T.; Takahara, A. *Langmuir,* 2005, 21, 7299-7302), complex fabrication techniques (Yang, H. T.; Jiang, P. *Langmuir,* 2010, 26, 12598-12604; Bravo, J.; Zhai, L.; Wu, Z. Z.; Cohen, R. E.; Rubner, M. F. *Langmuir,* 2007, 23, 7293-7298), and are often limited by the substrate type and geometry that can be successfully coated. (Hikita et al. 2005; Yang & Jiang, 2010; Furstner, R.; Barthlott, W.; Neinhuis, C.; Walzel, P. *Langmuir,* 2005, 21, 956-961).

It is evident that there is an unmet need for alternative methods of preparing superhydrophobic surfaces.

BRIEF SUMMARY

In one aspect, the present subject matter is directed to a method of preparing a coating, comprising: a) contacting under mild conditions a silica-containing colloid with two or more silanes to prepare a first colloid mixture, and b) contacting under mild conditions said first colloid mixture with an acid, wherein a superhydrophobic coating is prepared.

In another aspect, the present subject matter is directed to a method of reducing microbial adhesion, condensation or ice buildup, comprising contacting the coating prepared as described herein with a solid substrate.

In another aspect, the present subject matter is directed to a method of increasing the static water contact angle of a surface in need thereof to >90 degrees comprising contacting the coating prepared as described herein with the surface.

In another aspect, the present subject matter is directed to a method of providing protection of a solid substrate from environmental conditions comprising contacting the coating prepared as described herein with a solid substrate in need of protecting.

In another aspect, the present subject matter is directed to a coating comprising a silica nanoparticle prepared according to the methods disclosed herein.

In another aspect, the present subject matter is directed to a fluorosilane/silica colloid superhydrophobic coating which is used to coat the surfaces described herein.

In another aspect, the present subject matter is directed to a medical device comprising a coating as described herein or prepared by a method as disclosed herein.

BRIEF DESCRIPTION OF THE DRAWINGS

The present invention will be better understood and features, aspects and advantages other than those set forth above will become apparent when consideration is given to the following detailed description thereof. Such detailed description makes reference to the following drawings, wherein:

FIGS. 2A-D depict static water contact angles (degrees). Abbreviations refer to: in FIG. 2A, 100-M (non-doped 100% MTMOS xerogel); in FIG. 2B, 30-FM (non-doped 30% 17FTMS-MTMOS xerogel); in FIG. 2C, SC-100-M (silica colloid containing 100% MTMOS xerogel); and FIG. 2D, SC-30-FM (silica colloid containing 30% 17FTMS-MTMOS xerogel).

FIGS. 12A-C depict SEM images of Si nanoparticles contained in the superhydrophobic coatings described herein.

FIGS. 13A-B depict SEM images of Si nanoparticles contained in the superhydrophobic coatings described herein.

FIG. 18 depicts the static water angle of superhydrophobic coatings containing 500 nm particles on several coated substrates.

DETAILED DESCRIPTION

Figure 1A:
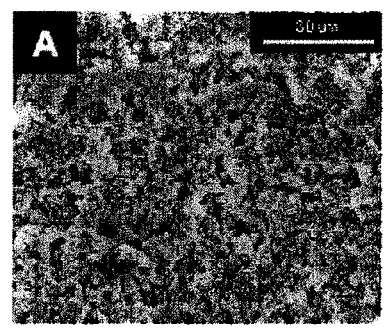
FIG. 1A depicts a SEM image of 30% 17FTMS-MTMOS xerogel doped with 30% 17FTMS-TEOS silica colloids at 1500× magnification.

The presently disclosed straight-forward, flexible synthesis of silica colloid-based superhydrophobic surfaces is useful in preparing coatings. Prior methods require harsh conditions, i.e., highly corrosive chemicals and/or high temperatures. Thus the prior methods require expensive, complicated equipment to facilitate providing the needed conditions. Alternatively, the prior methods require direct physical modification of the substrate to be coated. These conditions and modifications severely limit the types and sizes of the substrates that can be coated. On the other hand, the present methods disclosed herein employ sol-gel-type chemistry for colloid and xerogel synthesis. Advantageously, there is no requirement for corrosive or high temperature conditions or physical modifications of the substrate. Accordingly, unlike the prior methods, the present methods do not limit the types and sizes of substrates that can be coated. Further, the surface chemistry and physical properties of the resulting coatings can be tuned and optimized for a multitude of applications, including medical devices. Additionally, bacterial resistance of superhydrophobic surfaces may be easily enhanced by doping in or modifying silane precursors with further active agents such as nitric oxide releasing agents, film-forming components or biocides that, for example, can impart antimicrobial efficacy to the coating.

As used herein, the term "colloid" is defined as is known in the art. It refers to at least one substance that is dispersed in another substance.

As used herein, "mild conditions" is intended to mean the synthetic conditions to which a chemical process is subjected to in order to complete the process. In some embodiments, it is intended to mean that corrosive conditions are avoided. One of skill in the art would immediately recognize the corrosive conditions employed in prior art methods are those that employ corrosive agents and that such agents and conditions are advantageously avoided in the present methods. In some embodiments, it is intended to mean that excessive temperatures are avoided. Preferably, the temperature of the conditions is below about 100° F. In some embodiments, it is intended to mean that there is no addition of heat, besides any heat generated by the process itself, introduced into the conditions. In some embodiments, it is intended to mean that the process proceeds at room temperature, not including any heat generated by the chemical reaction itself.

The term "acid" as used herein refers to a "mineral acid" or an "organic acid." The term "mineral acid" as used herein refers to an acid derived from one or more inorganic compounds. Mineral acids release hydrogen ions when dissolved in water. Examples of mineral acids include hydrochloric acid, phosphoric acid, sulfuric acid, nitric acid, boric acid, hydrofluoric acid, hydrobromic acid and the like. An "organic acid" refers to an organic compound with acidic properties. Most commonly, these acids include carboxylic acids, wherein the acidity is associated with their carboxyl group —COOH. Other acids include sulfonic acids containing the —$SO_2OH$ group.

The term "base" as used herein refers to a base hydroxide, hydride or amine. Examples of suitable bases include, but are not limited to, alkali metal (for example potassium or sodium) hydrides, alkali metal alkoxides, ammonium hydroxide, tetramethyl ammonium hydroxide, hydroxylamine, sodium hydroxide, potassium hydroxide, ammonium, tetra-methyl ammonium hydroxide, tetra-ethyl ammonium hydroxide, tetra-propyl ammonium hydroxide, tetra-butyl ammonium hydroxide, pyridine, triethylamine and tributylamine and the like.

The term "solid substrate" is intended to mean any hard, rigid or semi-hard or semi-rigid, amorphous or polymeric substrate that can be contacted with a coating as described herein.

The term "sol gel" and "xerogel" are used in accordance with their meaning in the art. As described fully elsewhere herein, one aspect of the present disclosure is fluorinated sol gels and xerogels. The fluorinated components of these gels provide durability and stability over known gels. In embodiments, the Si particles described fully elsewhere herein can be fluorinated, for example, the particle can contain a covalently linked fluoroalkoxysilane. Alternatively, the Si particle may not be fluorinated. The superhydrophobic coatings described herein contain the gels comprising at least one fluoroalkoxysilane, wherein the Si particles are dispersed or contained in the gel.

Figure 16:
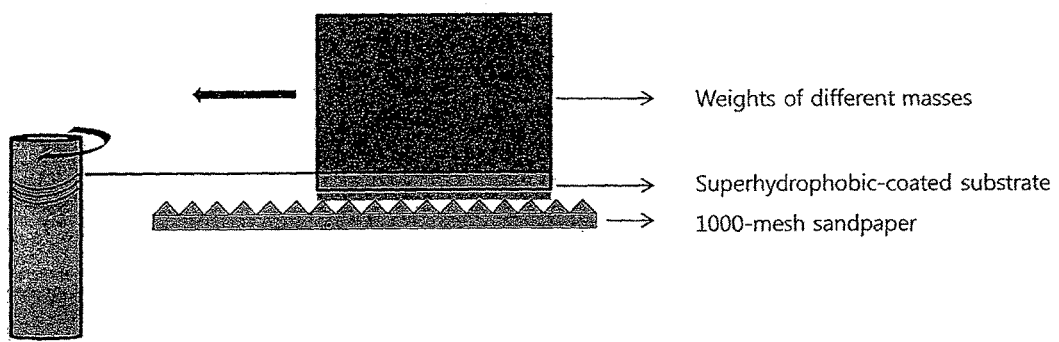
FIG. 16 depicts the method employed for the scratch test.
Figure 17:
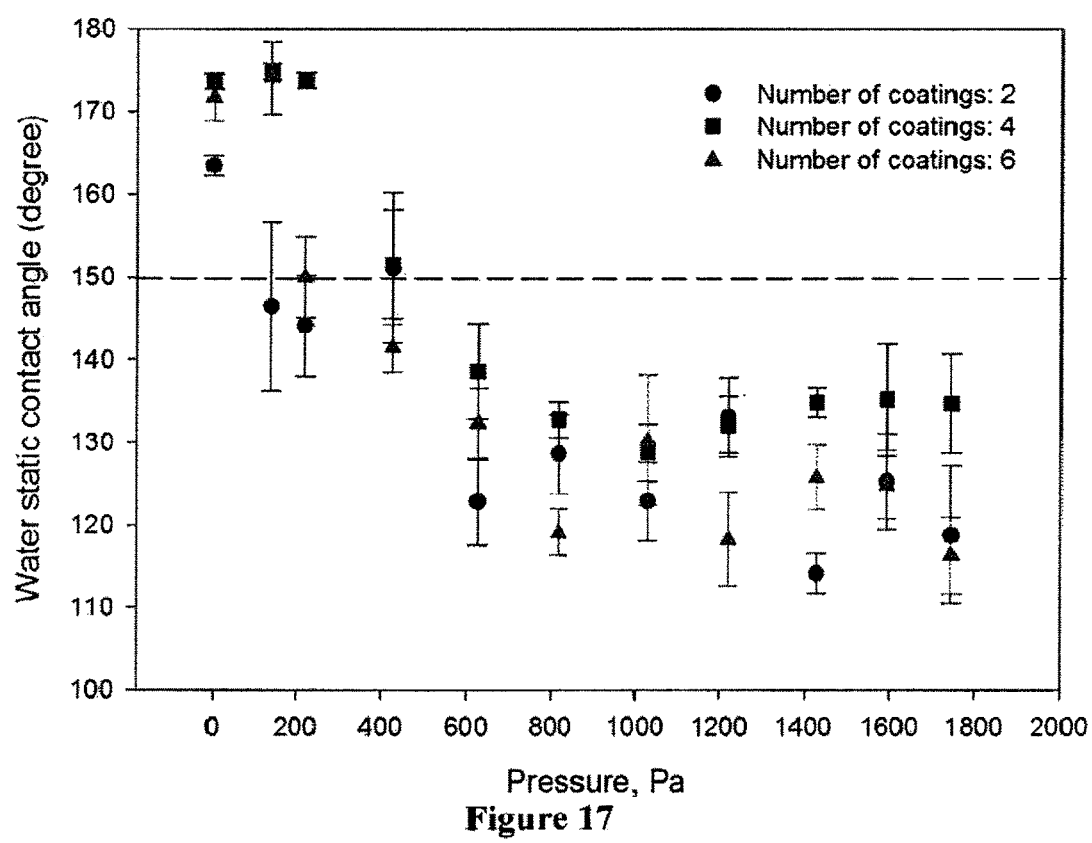
FIG. 17 depicts a plot of the static water contact angle measurement (degrees) and pressure applied in the scratch test. The coating was sprayed on by the spray coating technique. The coating comprised 14 nm $SiO_2$ (400 mg); 17-FTMS (221.42 µL, 0.6 mmol); MTMOS (199.69 µL, 1.4 mmol); 0.1M HCl (200 µL); $H_2O$ (2 mL); EtOH (9.4 mL) and Acetone (1 mL). In this case, using only TEOS particles in a 17-FTMS/MTMOS thin film, superhydrophobicity was maintained until about 200 Pa. The particles were 14 nm.

Stability and durability can be measured by static water angle measurements over time or by a scratch test. To evaluate the physical durability of the superhydrophobic coatings, the methodology illustrated in FIG. 16 was employed. Briefly, the superhydrophobic surfaces faced a 1000-mesh sandpaper which was served as an abrasion material. While different pressures (i.e., from 130 to 1750 Pa) were applied to the superhydrophobic surface, the surface was moved in one direction with a constant speed of 2.0 cm/s. The contact angles of the superhydrophobic surfaces were then measured after abrasion. Preferably, the superhydrophobic coatings maintain at least about 80% of the initial static water contact angle over a period of at least about 22 days, one month or one year or more. More preferably, the superhydrophobic coatings maintain at least about 85% of the initial static water angle during one of these periods of time. Also preferred, the superhydrophobic coatings maintain at least about 90% of the initial static water angle during one of these periods of time. Most preferably, the superhydrophobic coatings maintain at least about 95% to about 100% of the initial static water angle during one of these periods of time. Referring to the scratch test, preferably, the superhydrophobic coatings maintain at least about 80% of the initial static water contact angle under about 500 Pa or less, such as 400 Pa. Preferably, the static water angle is 150 degrees or greater. More preferably, the superhydrophobic coatings maintain at least about 85% of the initial static water contact angle under about 500 Pa or less. Also preferred, the superhydrophobic coatings maintain at least about 90 of the initial static water contact angle under about 500 Pa or less, such as 400 Pa. Most preferably, the superhydrophobic coatings maintain at least about 95% to about 100% of the initial static water contact angle under about 450 Pa or less, such as 200 Pa.

In an embodiment, the present subject matter is directed to a method of preparing a coating, comprising a) contacting under mild conditions a silica-containing colloid with two or more silanes to prepare a first colloid mixture, and b) contacting under mild conditions said first colloid mixture with an acid, wherein a superhydrophobic coating is prepared. The acid is preferably a mineral acid. More preferably, the acid is selected from the group consisting of hydrochloric acid, phosphoric acid, nitric acid and sulfuric acid. Most preferably, the acid is hydrochloric acid. Useful concentrations of acid include from about 0.01M to about 1.0M. Because the methods employ mild conditions, it is preferred that the concentration of acid is between about 0.05M to about 0.5M.

In a preferred embodiment, performing a) comprises contacting under mild conditions the colloid with a xerogel comprising said two or more silanes to prepare the superhydrophobic coating.

In preferred embodiments, the methods of preparing a coating further comprise prior to performing a), preparing a colloid by, a.i) contacting a silane with a silicate to prepare a first mixture, and a.ii) contacting said first mixture with a base to prepare the colloid. In this embodiment, it is preferred that the base is selected from the group consisting of alkali metal alkoxides and hydroxides, ammonium hydroxide, tetramethyl ammonium hydroxide, sodium hydroxide, potassium hydroxide, tetra-methyl ammonium hydroxide, tetra-ethyl ammonium hydroxide, tetra-propyl ammonium hydroxide and tetra-butyl ammonium hydroxide. More preferably, the base is ammonium hydroxide. Besides the amounts of base disclosed elsewhere herein, one of ordinary skill in the art can readily determine useful concentrations of appropriate bases.

In an embodiment, the methods of preparing a coating further comprise after performing a.ii), performing a.iii) to isolate the colloid. Any means of isolating can be performed including physically separating by filtration, centrifugation, chromatography or a combination of separation methods. Preferably, isolating comprises centrifuging the mixture of a.ii) to isolate said colloid. After centrifugation, the colloids can be separated from the supernatant by any known method.

In an embodiment, the methods of preparing a coating further comprise after performing b) performing c) by contacting the product of b) with a solid substrate. Coatings can be applied to substrates in any manner known including dip-, spin-, spread- or spray-coating. The superhydrophobic coatings described herein are particularly suitable for application using a spray-coating technique. A typical spray atomizer can be employed for this application. Spray coating is useful for coating substrates greater than 1 cm in size. A particularly useful embodiment of the coatings described herein is spray coating large surfaces having a size greater than that which can be coated by lithographic techniques, for example, walls or ship hulls. Spray coatings can be layered with one or more layers in a controlled manner. Preferably, the substrate is coated with one to ten layers. More preferably, the substrate is coated with one to six layers. Most preferably, the substrate is coated with two to four layers. Each successive layer can be coated with the same superhydrophobic coating or a different superhydrophobic coating. Examples of applying a coating including layering are described in U.S. Appl. Pub. No. 2006/0029808 A1, herein incorporated by reference in its entirety.

In an embodiment, the of methods of preparing a coating further comprise after performing c) performing d) by allowing the coating to dry, wherein a film comprising the coating is formed on at least a portion of the substrate.

In an embodiment, disclosed herein is a method of reducing microbial adhesion, condensation or ice buildup, comprising contacting a coating prepared with a method described herein with a solid substrate. Preferably, the method results in microbial adhesion that is reduced by at least about 90% compared to a non-coated substrate. More preferably, the method results in microbial adhesion that is reduced by at least about 95%. Most preferably, the method results in microbial adhesion that is reduced by at least about 95%. The microbial adhesion can also be compared to a substrate that is coated with a coating lacking silica nanoparticles. Preferably, the microbes are bacteria and/or fungi. The bacteria can be gram (+) or gram (−) as is known in the art. When the coating is on a medical device, it is more preferred that the bacterium is *Staphylococcus aureus* or *Pseudomonas aeruginosa*, two bacterial species commonly implicated in medical device infections.

In some embodiments, the coating of the present invention can prevent adhesion of one of more fungal species. In certain embodiments, the fungal species is a *Candida* species. In some embodiments, the *Candida* species can be selected from the group consisting of *Candida albicans, Candida tropicalis*, and *Candida parapsilosis*. In some other embodiments, the fungal species is *Trycophytum rubrum*.

In an embodiment, the methods of preparing a coating further comprise at any point in the method, introducing additional functional components. The additional functional components can be selected from the group consisting of biocides, film-forming agents, colorants, scent agents and nitric oxide releasing agent. Examples include silica nanoparticles and xerogels capable of releasing antimicrobial concentrations of nitric oxide. (Hetrick, E. M., Schoenfisch, M. H., *Biomaterials,* 2007, 28, 1948-1956; Hetrick, E. M., Shin, J. H., Stasko, N. A., Johnson, C. B., Wespe, D. A., Holmuhamedov, E., Schoenfisch, M. H., *Acs Nano,* 2008, 2, 235-246). The biocide can be used to inhibit or prevent growth or one or more types of microorganisms. The colorant can be used to produce a certain color on a surface after the coating material of the present invention has been applied to the surface. The scent agent can be used to produce a desired scent on a surface after the colloidal particle containing material of the present invention is applied to the surface. The coatings of the present invention can be formulated in a mixture that also includes one or more solvents, propellants, adhesion promoters, dendrimers, thickeners, preservatives, UV protector agents, and the like. The coating may also contain drying control additives including formamide, dimethylformamide, acetonitrile, oxalic acid, and/or surfactants. In some embodiments, the coating may be modified to contain one or more therapeutic agents. The additional therapeutic agents may be covalently linked to the silica components or network or may be doped into the material. In one particular embodiment, the coating contains heparin, which can be attached to the coating via a poly(ethylene glycol) linker.

Non-limiting examples of solvents include, but are not limited to, water, polydimethylsiloxane (silicon fluid), mineral spirits, D4®, D5®, D6®, LPA® solvents (LPA®, LPA-142®, LPA-150®, LPA-170®, etc.), hexane, pentane, ethanol, ethylacetate, propanol, 2-propanol, diethylether, methanol, ethanol, butanol, 2-butanol, TPA-5®, cyclopentane, and/or toluene. If present, the solvent content can be at least about 1 weight percent of the formulation and generally less than about 99 weigh percent of the formulation.

Although the present coating exhibits properties that reduce microbial adhesion without the need for an added biocide component, a biocide can be added to the coating. When a biocide is used, it can be selected to at least partially inhibit, prevent, reduce or eliminate the growth of one or more undesirable organisms (e.g., bacteria, fungus, viruses, insects, etc.) that contact and/or are in close proximity to the coated surface. Many different types of biocides can be used in the coating. Non-limiting examples of biocides that can be used include, but are not limited to, cationic biocides (e.g., biguanide compounds, quaternary ammonium salts, etc.), alcohols, peroxides, boric acid and borates, chlorinated hydrocarbons, organometallics, halogen-releasing compounds, mercury compounds, metallic salts, chitosan, hypochlorite producing agent, creosote bush particles, hemp particles, antimicrobial essential oils, pine oil, organic sulfur compounds, iodine compounds, silver nitrate, quaternary phosphate compounds, phenolics, APG, silver nano-particles, lactic acid crystals, alternate starch agglomerates, or some mixture thereof. The amount of the biocide in a particular formulation is selected to obtain the desired amount of organism prevention and/or protection. In one non-limiting embodiment of the invention, the formulation includes no more than about 10 weight percent biocide, when used, and typically about 0.01-2 weight percent biocide. As can be appreciated, other weight percentages can be used.

In all embodiments, the solid substrate can be any surface to which a coating can be applied. Surfaces that can be coated include those selected from the group consisting of medical devices, plumbing fixtures, condenser coils, optical surfaces, boat hulls and aircrafts. Other non-limiting examples include counter tops, windows, appliances, hard floors, rugs, tubs, showers, mirrors, toilets, bidets, bathroom fixtures, sinks, refrigerators, microwaves, small kitchen appliances, tables, chairs, cabinets, drawers, sofas, love seats, benches, beds, stools, armoires, chests, dressers, display cabinets, clocks, buffets, shades, shutters, entertainment centers, arm rails, lamps, banisters, libraries, cabinets, desks, doors, shelves, couches, carts, pianos, statues and other art, racks, fans, light fixtures, pool tables, ping pong tables, soccer tables, card tables, tools (e.g., hand powered and/or hand held tools, electrical tools, air powered tools, etc.), telephones, radios, televisions, stereo equipment, CD and DVD players, analog and digital sound devices, palm computers, laptop computers, desktop and tower computers, computer monitors, mp3 players, memory storage devices, cameras, camcorders, vehicle surfaces (e.g., windshield; tires; metal, fiberglass, composite material and/or plastic outer surfaces; fabric and/or vinyl outer surfaces; fabric, vinyl, and/or leather interior surfaces; metal, plastic, wood and/or composite material interior surfaces, glass interior surfaces, etc.), bicycles, snowmobiles, motorcycles, off-road-vehicles, yard equipment, farm equipment, washing equipment (e.g., power washers, etc.), painting equipment (e.g., electric and air powered painting equipment, etc.), medical and/or dental equipment, marine equipment (e.g., sail boats, power boats, rafts, sail board, canoe, row boats, etc.), toys, writing implements, watches, framed pictures or paintings, books, and/or the like. Any surface where it is desirable to cause one or more types of liquids to run off of a surface, to not be absorbed into a surface, and/or to not stain a surface, can be a substrate for coating. In preferred embodiments, the surface is in need of coating. For example, a surface that is exposed to environmental conditions that degrade the surface is in need of coating to protect the surface. Also where the surface can become a locus for microbial adhesion such as medical devices that contact bodily tissues or fluids is in need of coating. Preferably, the substrate is a medical device. In this aspect, it is most preferred that the medical device is implantable.

Medical devices such as catheters, which are adapted for movement through blood vessels or other body lumens, are typically provided with low-friction outer surfaces. If the surfaces of the medical devices are not low-friction surfaces, insertion of the devices into and removal of the devices from the body lumens becomes more difficult, and injury or inflammation of bodily tissue may occur. Low friction surfaces are also beneficial for reducing discomfort and injury that may arise as a result of movement between certain long term devices (e.g., long term catheters) and the surrounding tissue, for example, as a result of patient activity. Medical devices benefiting from superhydrophobic surfaces include a variety of implantable and insertable medical devices (also referred to herein as "internal medical devices"). Examples of such medical devices include, devices involving the delivery or removal of fluids (e.g., drug containing fluids, pressurized fluids such as inflation fluids, bodily fluids, contrast media, hot or cold media, etc.) as well as devices for insertion into and/or through a wide range of body lumens, including lumens of the cardiovascular system such as the heart, arteries (e.g., coronary, femoral, aorta, iliac, carotid and vertebro-basilar arteries) and veins, lumens of the genitourinary system such as the urethra (including prostatic urethra), bladder, ureters, vagina, uterus, spermatic and fallopian tubes, the nasolacrimal duct, the eustachian tube, lumens of the respiratory tract such as the trachea, bronchi, nasal passages and sinuses, lumens of the gastrointestinal tract such as the esophagus, gut, duodenum, small intestine, large intestine, rectum, biliary and pancreatic duct systems, lumens of the lymphatic system, the major body cavities (peritoneal, pleural, pericardial) and so forth. Non-limiting, specific examples of internal medical devices include vascular devices such as vascular catheters (e.g., balloon catheters), including balloons and inflation tubing for the same, hydrolyser catheters, guide wires, pullback sheaths, filters (e.g., vena cava filters), left ventricular assist devices, total artificial hearts, injection needles, drug delivery tubing, drainage tubing, gastroenteric and colonoscopic tubing, endoscopic devices, endotracheal devices such as airway tubes, devices for the urinary tract such as urinary catheters and ureteral stents, and devices for the neural region such as catheters and wires, trocar needles, bone anchors, bone screws, protective platings, joint replacements, electrical leads, biosensors, probes, sutures, surgical drapes, wound dressings, and bandages. Many devices in accordance with the invention have one or more portions that are cylindrical in shape, including both solid and hollow cylindrical shapes. Devices in accordance with the present invention may have a single superhydrophobic surface region or multiple superhydrophobic surface regions provided by a coating as described herein.

Solid substrate materials can include organic materials (e.g., materials containing 50 wt % or more organic species) such as polymeric materials, and inorganic materials (e.g., materials containing 50 wt % or more inorganic species), such as metallic materials (e.g., metals and metal alloys) and non-metallic materials (e.g., including carbon, semiconductors, glasses and ceramics, which may contain various metal- and non-metal-oxides, various metal- and non-metal-nitrides, various metal- and non-metal-carbides, various metal- and non-metal-borides, various metal- and non-metal-phosphates, and various metal- and non-metal-sulfides, among others). Specific examples of non-metallic inorganic materials can be materials containing one or more of the following: metal oxides, including aluminum oxides and transition metal oxides (e.g., oxides of titanium, zirconium, hafnium, tantalum, molybdenum, tungsten, rhenium, and iridium); silicon; silicon-based ceramics, such as those containing silicon nitrides, silicon carbides and silicon oxides (sometimes referred to as glass ceramics); calcium phosphate ceramics (e.g., hydroxyapatite); carbon; and carbon-based, ceramic-like materials such as carbon nitrides.

Specific examples of metallic inorganic materials may be selected, for example, from metals (e.g., biostable metals such as gold, platinum, palladium, iridium, osmium, rhodium, titanium, tantalum, tungsten, and ruthenium, and bioresorbable metals such as magnesium and iron), metal alloys comprising iron and chromium (e.g., stainless steels, including platinum-enriched radiopaque stainless steel), alloys comprising nickel and titanium (e.g., Nitinol), alloys comprising cobalt and chromium, including alloys that comprise cobalt, chromium and iron (e.g., elgiloy alloys), alloys comprising nickel, cobalt and chromium and alloys comprising cobalt, chromium, tungsten and nickel, alloys comprising nickel and chromium (e.g., inconel alloys), and bioabsorbable metal alloys, such as alloys of magnesium or iron in combination with Ce, Ca, Zn, Zr and/or Li.

Substrate materials containing polymers and other high molecular weight materials may be selected, for example, from substrate materials containing one or more of the following: polycarboxylic acid polymers and copolymers including polyacrylic acids; acetal polymers and copolymers; acrylate and methacrylate polymers and copolymers (e.g., n-butyl methacrylate); cellulosic polymers and copolymers, including cellulose acetates, cellulose nitrates, cellulose propionates, cellulose acetate butyrates, cellophanes, rayons, rayon triacetates, and cellulose ethers such as carboxymethyl celluloses and hydroxyalkyl celluloses; polyoxymethylene polymers and copolymers; polyimide polymers and copolymers such as polyether block imides, polyamidimides, polyesterimides, and polyetherimides; polysulfone polymers and copolymers including polyarylsulfones and polyethersulfones; polyamide polymers and copolymers including nylon 6,6, nylon 12, polyether-block co-polyamide polymers (e.g., Pebax® resins), polycaprolactams and polyacrylamides; resins including alkyd resins, phenolic resins, urea resins, melamine resins, epoxy resins, allyl resins and epoxide resins; polycarbonates; polyacrylonitriles; polyvinylpyrrolidones (cross-linked and otherwise); polymers and copolymers of vinyl monomers including polyvinyl alcohols, polyvinyl halides such as polyvinyl chlorides, ethylene-vinylacetate copolymers (EVA), polyvinylidene chlorides, polyvinyl ethers such as polyvinyl methyl ethers, vinyl aromatic polymers and copolymers such as polystyrenes, styrene-maleic anhydride copolymers, vinyl aromatic-hydrocarbon copolymers including styrene-butadiene copolymers, styrene-ethylene-butylene copolymers (e.g., a polystyrene-polyethylene/butylene-polystyrene (SEBS) copolymer, available as Kraton® G series polymers), styrene-isoprene copolymers (e.g., polystyrene-polyisoprene-polystyrene), acrylonitrile-styrene copolymers, acrylonitrile-butadiene-styrene copolymers, styrene-butadiene copolymers and styrene-isobutylene copolymers (e.g., polyisobutylene-polystyrene block copolymers such as SIBS), polyvinyl ketones, polyvinylcarbazoles, and polyvinyl esters such as polyvinyl acetates; polybenzimidazoles; ionomers; polyalkyl oxide polymers and copolymers including polyethylene oxides (PEO); polyesters including polyethylene terephthalates, polybutylene terephthalates and aliphatic polyesters such as polymers and copolymers of lactide (which includes lactic acid as well as d-, l- and meso lactide), epsilon-caprolactone, glycolide (including glycolic acid), hydroxybutyrate, hydroxyvalerate, para-dioxanone, trimethylene carbonate (and its alkyl derivatives), 1,4-dioxepan-2-one, 1,5-dioxepan-2-one, and 6,6-dimethyl-1,4-dioxan-2-one (a copolymer of polylactic acid and polycaprolactone is one specific example); polyether polymers and copolymers including polyarylethers such as polyphenylene ethers, polyether ketones, polyether ether ketones; polyphenylene sulfides; polyisocyanates; polyolefin polymers and copolymers, including polyalkylenes such as polypropylenes, polyethylenes (low and high density, low and high molecular weight), polybutylenes (such as polybut-1-ene and polyisobutylene), polyolefin elastomers (e.g., santoprene), ethylene propylene diene monomer (EPDM) rubbers, poly-4-methyl-pen-1-enes, ethylene-alpha-olefin copolymers, ethylene-methyl methacrylate copolymers and ethylene-vinyl acetate copolymers; fluorinated polymers and copolymers, including polytetrafluoroethylenes (PTFE), poly(tetrafluoroethylene-co-hexafluoropropene) (FEP), modified ethylene-tetrafluoroethylene copolymers (ETFE), and polyvinylidene fluorides (PVDF); silicone polymers and copolymers; polyurethanes; p-xylylene polymers; polyiminocarbonates; copoly(ether-esters) such as polyethylene oxide-polylactic acid copolymers; polyphosphazines; polyalkylene oxalates; polyoxaamides and polyoxaesters (including those containing amines and/or amido groups); polyorthoesters; biopolymers, such as polypeptides, proteins, polysaccharides and fatty acids (and esters thereof), including fibrin, fibrinogen, collagen, elastin, chitosan, gelatin, starch, glycosaminoglycans such as hyaluronic acid; as well as blends and further copolymers of the above.

In all embodiments, it is preferred that the mild conditions in both a) and b) comprise a temperature below about 100° F. or conditions that avoid refluxing. Preferred methods include those where both a) and b) proceed in the absence of corrosive conditions. Also preferred are methods where the mild conditions in both a) and b) or in one or the other proceed without introducing heat. More preferably, the mild conditions in both a) and b) refer to room temperature, not including any heat generated by the chemical reaction itself. Additionally, the mild conditions described herein involve no harsh organic solvents that could damage certain substrates such as plastics. Unlike known methods, the methods described herein comprise mild conditions as described herein, which avoid physical (plasma), chemical etching or chemical vapor deposition.

In all embodiments, the coatings prepared by the methods disclosed herein when dried preferably exhibit a static water contact angle that is higher than the initial static water contact angle of the surface of the substrate to be coated. Methods for measuring the static water contact angle are disclosed herein. Methods of determining water contact angles are also disclosed in US Appl. Pub. No. 2007/0005024 A1, herein incorporated by reference in its entirety. Useful coatings exhibit a static water contact angle >90 degrees when dried on a surface. Preferably, the static water contact angle is >150 degrees. More preferably, the static water contact angle is >160 degrees. Most preferably, the static water contact angle is >165 degrees. Thus, when a substrate is coated, the substrate exhibits a static water contact angle that is >90 degrees. Preferably, the substrates, including medical devices, comprising a coating described herein exhibit a static water contact angle that is >150 degrees, >160 degrees or >165 degrees.

Preferably, the silica-containing colloids exhibit an increased resistance to fouling when compared to coatings lacking the colloids. In useful embodiments, the colloids comprise silica nanoparticles. Silica nanoparticles can be prepared by the methods described herein for preparing a colloid. Alternatively, silica nanoparticles are known in the art and can be prepared by any known manner. In any case, the silica nanoparticles can then be incorporated into the methods described herein for preparing a coating. Silica nanoparticles can have diameters of about 5 nm to about 5 μm. In embodiments, the particles can have diameters of greater than 1000 nm. Preferably, the diameters are from about 5 nm to about 1000 nm. More preferably, the diameters are from about 100 nm to about 1000 nm. Most preferably, the diameters are from about 500 nm to about 1000 nm.

The coatings and/or the colloids contained therein may contain between 0-50 or 0-90 mole percent of fluorinated, cationic, or anionic silane residues. Silanes comprise one, two, three, or four alkoxy groups bonded to a silicon atom. Other substituents present on the silicon atom may vary. Particularly useful silanes include both alkoxysilanes such as fluorosilanes or fluoroalkoxysilanes and organosilanes such as aminoalkoxysilanes. The silanes, fluorosilanes, etc. disclosed herein are also silane precursors that can be further modified. Fluorosilanes and fluoroalkoxysilanes include heptadecafluoro-1,1,2-2-tetrahydrodecyl)triethoxysilane; (3,3,3-trifluoropropyl)trimethoxysilane; and (perfluoroalkyl)ethyltriethoxysilane. Cationic or anionic silanes include N—N-didecyl-N-methyl-N-(3-trimethoxysilyl)ammonium chloride; octadecyldimethyl(3-trimethoxysilylpropyl)ammonium chloride; 3-trihydroxysilylpropylmethyl phosphonate, sodium salt; and carboxyethylsilanetriol, sodium salt. The silane may be in the form of a mixture in any ratio.

The silanes employed in the present methods can be any useful silane, which includes fluorosilanes or fluoroalkoxysilanes. At least one silane is a fluorosilane or fluoroalkoxysilane and at least one other silane is referred to herein as a backbone silane. Examples of useful silanes include methyltrimethoxysilane (MTMOS), (heptadecafluoro-1,1,2,2-tetrahydrodecyl)trimethoxysilane (17FTMS), octyltrichlorosilane, propyltrichlorosilane, hexadecyltrichlorosilane, octyltriethoxysilane, trimethylmethoxysilane, dimethyl-propyl-chlorosilane, chlorodimethylphenylsilane, hexamethyldisilazane, 3-(Trimethoxysilyl)propyl methacrylate, Chlorodimethyl-octadecylsilane, Chlorotriethylsilane, Chlorotriisopropylsilane, Chlorotrimethylsilane, Dichloro(chloromethyl)-methylsilane, Dichloro-methyl-octadecylsilane, Dichlorodimethylsilane, Dimethoxymethyl-octadecylsilane, Trichloro(chloromethyl)silane, (3-Aminopropyl)triethoxysilane, 1H,1H,2H,2H-Perfluorooctyltriethoxysilane, 3-Cyanopropyltrichlorosilane, Chloro-dimethyl(3,3,3-trifluoropropyl)silane, Chloro(dimethyl)thexylsilane, Chlorodimethyl(2,3,4,5-tetramethyl-2,4-cyclopentadien-1-yl)silane, Chlorodimethyl(pentafluorophenyl)silane, Chlorodimethylphenethylsilane, Chloromethyl(dimethyl)silane, (Chloromethyl)methylbis(pentafluorophenyl)silane, Chlorotris(1,3-dimethylbutoxy)silane, Chlorotris(trimethylsilyl)silane, Dichloromethyl-octylsilane, Dichloromethyl(2-phenethyl)silane, Diisopropyl(3,3,4,4,5,5,6,6,6-nonafluorohexyl)silane, Diisopropyl(3,3,4,4,5,5,6,6,7,7,8,8,8-tridecafluorooctyl)-silane, Diisopropyl(3,3,4,4,5,5,6,6,7,7,8,8,9,9,10,10,10-heptadecafluorodecyl)silane, Dimethoxymethyl(3,3,3-trifluoropropyl)silane, Ethyltrichlorosilane, Isobutyl(tri-methoxy)silane, Methyltrichlorosilane, Methyltris(tri-sec-butoxysilyloxy)silane, Phenyl-tris(trimethylsiloxy)silane, tert-Butyldimethyl(2-propynyloxy)silane, Triacetoxy(methyl)silane, Triacetoxy(vinyl)silane, Trichloro(1H,1H,2H,2H-perfluorooctyl)silane, Trichloro-(2-chloroethyl)silane, Trichloro[2-(chloromethyl)-allyl]silane, Trichloro(2-cyanoethyl)silane, Trichloro(3,3,3-trifluoropropyl)silane, Trichloro(3,3,4,4,5,5,6,6,7,7,8,8,8-tridecafluorooctyl)silane, Trichloro(3-chloropropyl)silane, Trichloro(3-cyanopropyl)silane, Trichloro(4-chlorophenyl)silane, Trichloro(dichloromethyl)silane, Trichloro(hexyl)silane, Trichloro(isobutyl)silane, Trichloro(octadecyl)silane, Trichloro(octyl)silane, Trichloro(phenethyl)silane, Trichloro(phenyl)silane, Trichloro(propyl)silane, Triethoxy(1-phenylethenyl)silane, Triethoxy(3-isocyanatopropyl)silane, Triethoxy(4-methoxyphenyl)silane, Triethoxy(4-(trifluoromethyl)phenyl)silane, Triethoxy(ethyl)silane, Triethoxy-(isobutyl)silane, Triethoxy(octyl)silane, Trimethoxy(2-phenylethyl)silane, Trimethoxy(3,3,3-trifluoropropyl)silane, Trimethoxy[3-(methylamino)propyl]silane, Trimethoxy[3-(phenylamino)propyl]silane, Trimethoxy(7-octen-1-yl)silane, Trimethoxy(octadecyl)silane, Trimethoxy (octadecyl)silane, Trimethoxy(propyl)-silane, Trimethoxy (vinyl)silane, Vinyltrimethoxysilane, Trimethoxy[2-(7-oxabicyclo[4.1.0]hept-3-yl)ethyl]silane, Chlorodiphenyl (diphenylmethyl)silane, Chloromethyl-triethyl-silane, Chloromethyldimethyl(pentachlorophenyl)silane, Chlorotri (2-biphenylyl)silane, Chlorotri(O-tolyl)silane, Chlorotris(1-Naphthyl)silane, Chlorotris(2-Methoxyphenyl)silane, butyltrimethoxysilane, butyltriethoxysilane, propyltrimethoxysilane, octadecyltrimethoxysilane, and combinations thereof, an aminoalkoxysilane such as N-(6-aminohexyl)aminomethyltrimethoxysilane; N-(6-aminohexyl)aminopropyltrimethoxysilane; N-(6-aminoethyl)aminopropyltrimethoxysilane; [3-(methylamino)propyl]trimethoxysilane; N-butylaminopropyltrimethoxysilane, Heptadecafluoro-1,1,2,2-tetra-hydrodecyl)trichlorosilane, (Heptadecafluoro-1,1,2,2-tetra-hydrodecyl)triethoxysilane, (Tridecafluoro-1,1,2,2-tetrahydrooctyl)trimethoxysilane, Ethyltrimethoxysilane, Methyltriethoxysilane, N-propyltrimethoxysilane, (Perfluoroalkyl)Ethyltriethoxysilane, Nonafluorohexyltrimethoxysilane and combinations thereof. Preferably, the fluoroalkoxysilane is (heptadecafluoro-1,1,2,2-tetrahydrodecyl)trimethoxysilane. A preferred backbone silane is methyltrimethoxysilane (MTMOS). Also suitable are buthyltrimethoxysilane (BTMOS), tetramethoxysilane (TMOS), tetraethoxysilane (TEOS) and their combinations thereof. A silane functions as a backbone by covalently linking, and additionally complexing, two or more other silanes or colloid(s) in a network.

The silanes can also include thiol functionalities. For example, silanes such as Mercaptopropyl)methyldimethoxysilane, 3-Mercaptopropylmethyldimethoxysilane, 3-Mercaptopropyltriethoxysilane, 3-Mercaptopropyltrimethoxysilane. These silanes can also be nitrosated to form a nitrosothiol, which can release nitric oxide under certain conditions, such as exposure to heat, light or copper.

The silicates employed can be one or more tetraalkylorthosilicates having alkyl groups of from 1 to 20 carbon atoms, having the general formula $Si(OR)_4$. Illustrative examples include tetramethylorthosilicate, tetraethylorthosilicate $(Si(OC_2H_5)_4)$, and the like. Such tetraalkylorthosilicates may used in one exemplary embodiment in an amount of from about 0.1 mmol to about 10 mmol. In preparing the colloids, the ratio of silicate to fluoroalkoxysilane can preferably be about 0.01:10.0 or about 10.0:0.01. More preferably, the silicate is in excess of the silane on a molar basis. The ratio is from about 1.1 to about 3.5. Most preferably, the amount of silicate is about 2.3× the amount of silane to prepare the colloids.

Xerogels and sol-gels are known in the art. Sol-gel technology provides a versatile approach to preparing biocompatible and multicomponent materials with a wide range of properties. For an overview of biomedical applications using sol-gel technology, see Gupta & Kumar, *Biomed. Mater.* 3: 1-15 (2008), incorporated herein by reference. In a sol-gel process, a sol is first formed by mixing the precursors, one or more solvents, and in some cases, an acid or base catalyst. Through a series of hydrolysis and condensation reactions, a silica-based network is formed, which upon drying forms a gel. As described fully herein, the present superhydrophobic coatings comprise fluorinated gels. The gels contain at least one fluoroalkoxysilane material. Also incorporated into the gel of the coating material are particles, which may or may not be further fluorinated as described herein.

Figure 15:
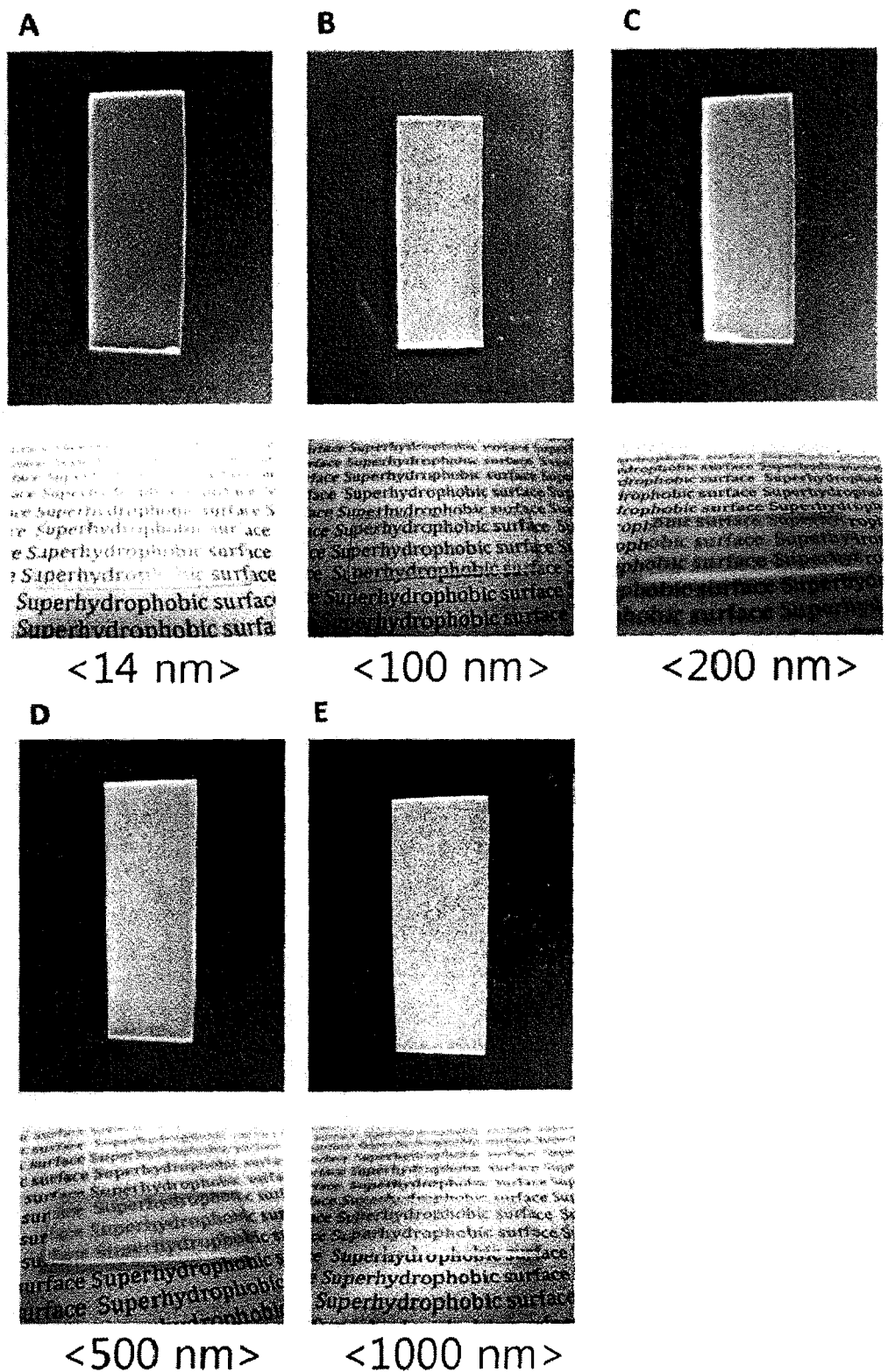
FIG. 15 depicts the transparency of several superhydrophobic films described herein.

It has been found that the coatings can be made more transparent by employing about 50% or more of particles that do not contain fluorosilanes, fluoroalkoxysilanes or fluorosilicates and the like. Particles of about 50 nm diameter or less are preferred. More preferred are coatings containing predominantly particles of about 20 nm diameter or less. Most preferred are coatings containing particles of about 10-15 nm diameter in size, with particles of about 14 nm providing a preferred level of transparency. However, as described throughout the present description, the gel employed can contain fluorosilanes, fluoroalkoxysilanes and the like. The higher the percentage of particles that do not contain fluorosilanes, in general, the more transparent a coating will appear. As shown in FIG. 15, in embodiments, the coatings described herein are transparent such that visual characters are recognizable through the coating or film, as well as the substrate when the substrate is also transparent.

Another embodiment is a colloidal composition comprising two or more silanes admixed under mild conditions with an acid. At least one of the silanes comprises 0-50% or 0-90% fluorinated silane residues. In an embodiment of the colloidal composition, the silanes are selected from the group consisting of (heptadecafluoro-1,1,2-2-tetrahydrodecyl)triethoxysilane; (3,3,3-trifluoropropyl)trimethoxysilane; and (perfluoroalkyl)ethyltriethoxysilane. In another embodiment of the colloidal composition, the silanes comprise at least one backbone silane. In some embodiments of the colloidal composition, the backbone silane is methyltrimethoxysilane.

Another embodiment is directed to a coating composition comprising, nanostructured fluorinated silica colloids, and a fluoroalkoxysilane covalently linked to at least one additional silane. Preferably, the at least one additional silane is a backbone silane. Preferably, the fluoroalkoxysilane is selected from the group consisting of (heptadecafluoro-1,1, 2-2-tetrahydrodecyl)triethoxysilane; (3,3,3-trifluoropropyl) trimethoxysilane; and (perfluoroalkyl)ethyltriethoxysilane. More preferably, the coating composition comprises a fluoroalkoxysilane that is heptadecafluoro-1,1,2-2-tetrahydrodecyl)triethoxysilane and a backbone silane that is methyltrimethoxysilane. Preferably, the coating contains from about 10% to about 50% silanes. More preferably, the coating contains from about 20% to about 40% silanes. Most preferably, the coating contains about 30% silanes. The composition comprises the nanostructured colloids and the silanes, wherein at least one of the silanes will be covalently linked to other silanes by a —Si—O—Si— siloxane bond, and at least one of the colloids will be covalently linked to a silane by a —Si—O—Si siloxane bond. In each case, at least one Si atom that is covalently bound to the silane or colloid and is further covalently bound to an oxygen atom, which, in turn, is covalently bound to an additional Si atom, which is covalently bound to a silane or colloid. Consequently, a network of silanes and colloids can be prepared for use as a coating composition.

In preferred embodiments, the compositions and coatings described herein are those prepared by contacting the nanostructured fluorinated silica colloids with the silanes described herein under mild conditions in the presence of an acid.

The following examples are offered by way of illustration and not by way of limitation.

EXAMPLES

In the following examples, a superhydrophobic xerogel coating was synthesized from a mixture of nanostructured fluorinated silica colloids, fluoroalkoxysilane, and a backbone silane. The resulting surface was characterized by contact angle goniometry, scanning electron microscopy (SEM), and atomic force microscopy (AFM). Quantitative bacterial adhesion studies performed using a parallel plate flow cell demonstrated that the adhesion of *Staphylococcus aureus* and *Pseudomonas aeruginosa* were reduced by 2.08±0.25 log and 1.76±0.12 log over controls, respectively. This superhydrophobic coating synthesis can be applied to any surface regardless of size or geometry, making it an ideal candidate for biopassivation of implanted medical devices.

1. Preparation of Silica Colloids

Silica colloids were synthesized by sonicating a mixture of 1.87 mmol (heptadecafluoro-1,1,2,2-tetrahydrodecyl) trimethoxysilane (17FTMS) and 4.36 mmol tetraethylorthosilicate (TEOS) for 5 min. The silane mixture was added dropwise to a stirred solution of 30 mL ethanol (absolute) and 12 mL ammonium hydroxide over 30 min to form silica colloids. After an additional 20 min of vigorous mixing at room temperature, the white precipitate was collected via centrifugation, washed twice with ethanol, and dried in ambient conditions overnight. The resulting silica colloids were composed of agglomerated silica particles, giving them a roughness on both a micro- and nano-scale.

2. Preparation of a Superhydrophobic Coating Comprising Nanostructured Fluorinated Silica Colloids Superhydrophobic coatings comprising silica nanoparticles were prepared by dispersing 400 mg of silica colloids from Example 1 in cold ethanol (9.4 mL) via sonication for 5 min, followed by the addition of 0.3 mmol 17FTMS and 0.7 mmol MTMOS and an additional 5 min of sonicaiton. The mixture was then added to a flask containing 2 mL $H_2O$ and 200 μL 0.1 M HCl and stirred vigorously for 1 hr. The mixture is then ready for use to be applied as a coating.

3. Characteristics of Dry Coatings

Figure 1B:
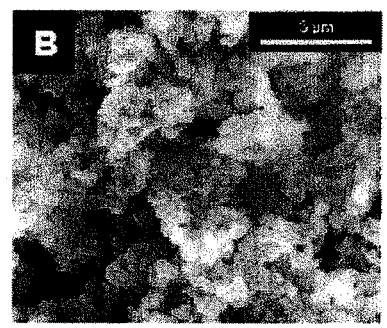
FIG. 1B depicts a SEM image of 30% 17FTMS-MTMOS xerogel doped with 30% 17FTMS-TEOS silica colloids at 15,000× magnification.
Figure 3:
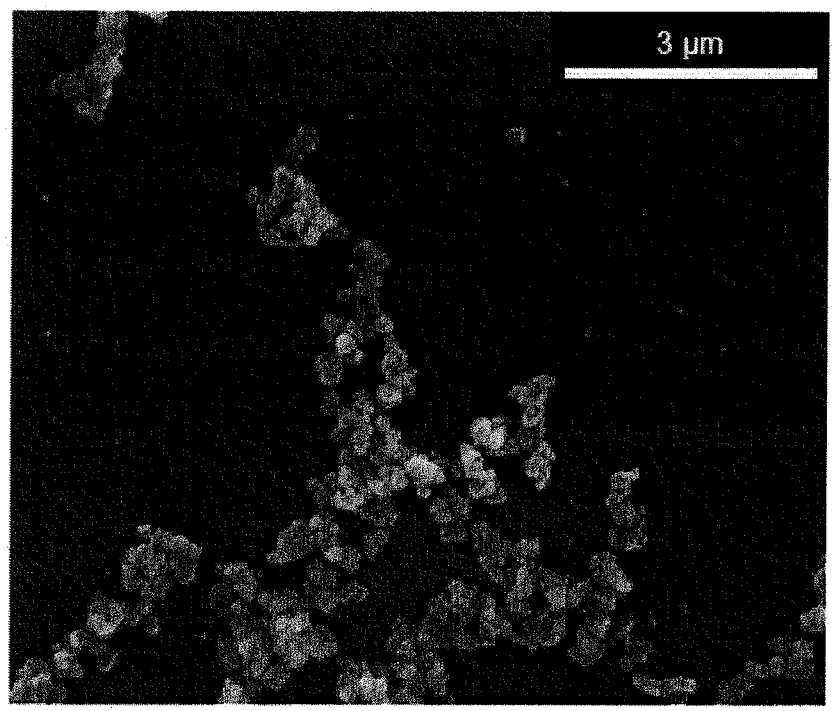
FIG. 3 depicts a SEM image of 30% 17FTMS-TEOS silica colloids.
Figure 4:
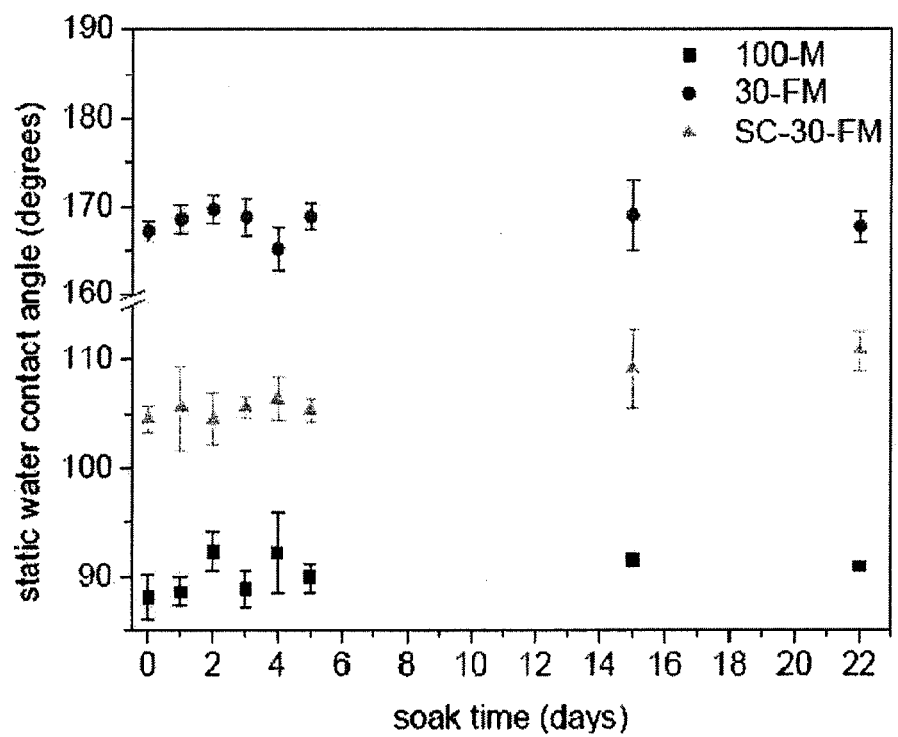
FIG. 4 depicts data showing the static water contact angles after immersion in distilled water at 25° C.

The mixture from Example 2 solution was spread-cast onto ozone/UV-treated glass slides (69.4 μL sol solution/$cm^2$) and dried overnight in ambient conditions, resulting in an opaque white film. Three types of control xerogels were synthesized, one containing particles but no 17-FTMS, one with 17-FTMS but not particles, and one with no particles and no 17-FTMS (100% MTMOS). Sol solutions not containing particles were applied to glass substrates via spin-casting (200 μL at 3000 rpm for 10 s) due to the difficulty in spread-casting even xerogel films in the absence of silica colloids. Scanning electron microscopy (SEM) images of the resulting silica colloid-containing fluorinated xerogel surfaces are shown in FIG. 1 and reveal a dense layer of agglomerated particles with both micro- and nano-scale features. This is a prerequisite surface property for obtaining superhydrophobicity. (Li, X. M.; Reinhoudt, D.; Crego-Calama, M. *Chem. Soc. Rev.,* 2007, 36, 1529-1529). The presence of the 17FTMS-MTMOS xerogel film was not readily apparent in the SEM images as it was likely spread as a thin coating on the high surface area created by the particles. This film serves as both a binder to hold the silica colloids in place and as a low surface energy chemical modification.

4. Determining Static Water Contact Angle

The static water contact angle and surface roughness of the resulting films were measured using contact angle goniometry and atomic force microscopy (AFM). Static water contact angles for the silica colloid-containing 30% 17FTMS-MTMOS xerogels (SC-30-FM) and 100% MTMOS xerogels (SC-100-M) were 167.7±1.8 and 151.0±0.5°, respectively. Static water contact angles for the non-doped 30% 17FTMS-MTMOS xerogels (30-FM), and the 100% MTMOS xerogels (100-M), were 104.7±0.8, and 88.3±5.5°, respectively. For both the silica colloid-doped and non-doped surfaces, the increase in contact angle resulting from chemical modification by 17-FTMS increased the static water contact angles by about 16°. The surface roughness of the three substrates was measured via AFM over a 20 μm×20 μm field. The control films 30-FM and 100-M had minute surface roughness values of 11.7±0.3 nm and 1.5±1.3 nm, respectively. The surface roughness values of the SC-30-FM and SC-100-M were the greatest (898.5±84.8 and 573.8±154 nm, respectively), likely the result of the incorporated silica colloids.

5. Coating Stability

Coating stability testing was performed by soaking coated substrates in distilled water at 25° C. and measuring the static water contact angle periodically for 16 d. The contact angle was maintained for all surfaces over these studies.

6. Cell Adhesion

Adhesion of gram(+) *Staphylococcus aureus* and gram(−) *Pseudomonas aeruginosa*, two bacterial species commonly implicated in medical device infections, was evaluated on superhydrophobic and control surfaces using a custom fabricated flow cell assay. Briefly, bacterial suspensions containing $10^8$ colony forming units per mL in PBS were flowed over the superhydrophobic and control substrates at 0.2 mL/min for 90 min and then rinsed with PBS without the passage of an air-water interface. Adhered bacteria were removed from the substrates via sonication in 5 mL PBS for 15 min and enumerated by serial dilution and plating on nutrient agar. The results of the bacterial adhesion assay are shown in FIG. 2.

Figure 5:
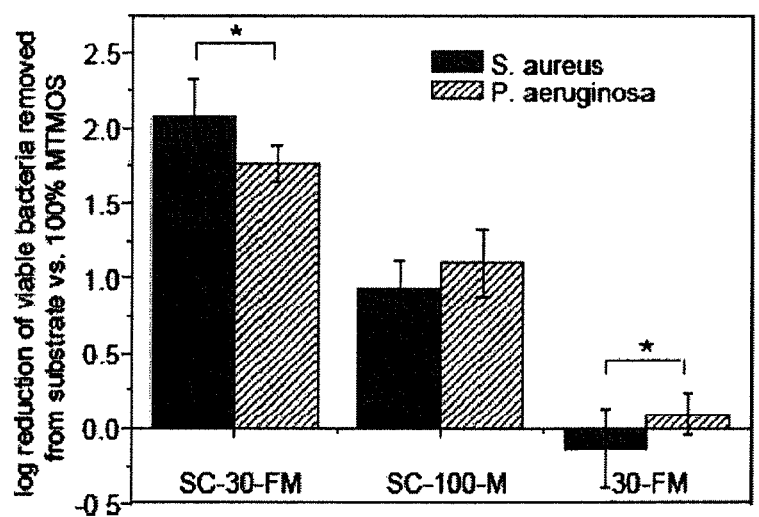
FIG. 5 depicts the reduction in the adhesion of S. aureus and P. aeruginosa on superhydrophobic 30% FTMS-TEOS-doped 30% FTMS-MTMOS(SC-30-FM) and hydrophobic 30% 17FTMS-MTMOS (30-FM) xerogels versus hydrophilic 100% MTMOS controls (100-M).
Figure 6:
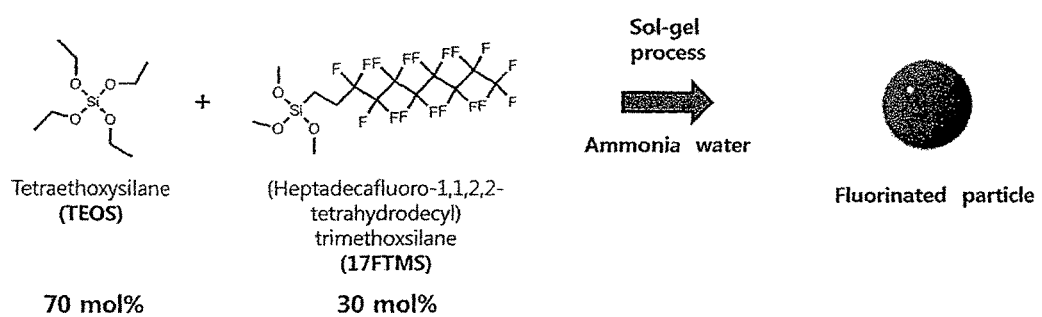
FIG. 6 depicts a method of preparing a fluorinated silica particle.
Figure 7:
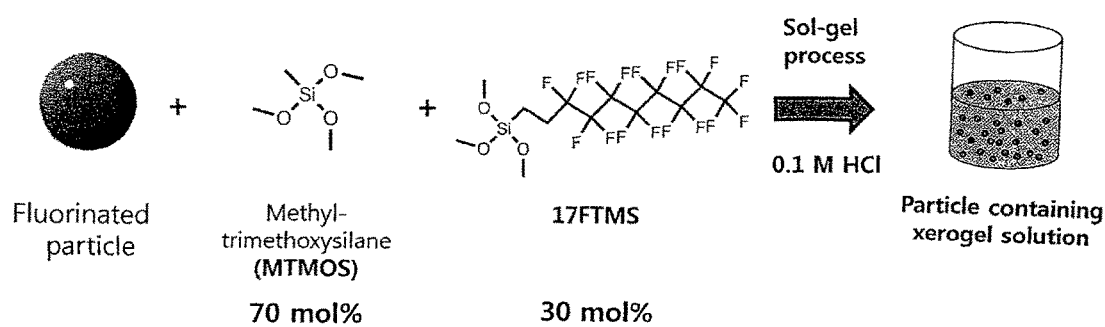
FIG. 7 depicts a method of preparing a fluorinated xerogel containing silica particles.
Figure 8:
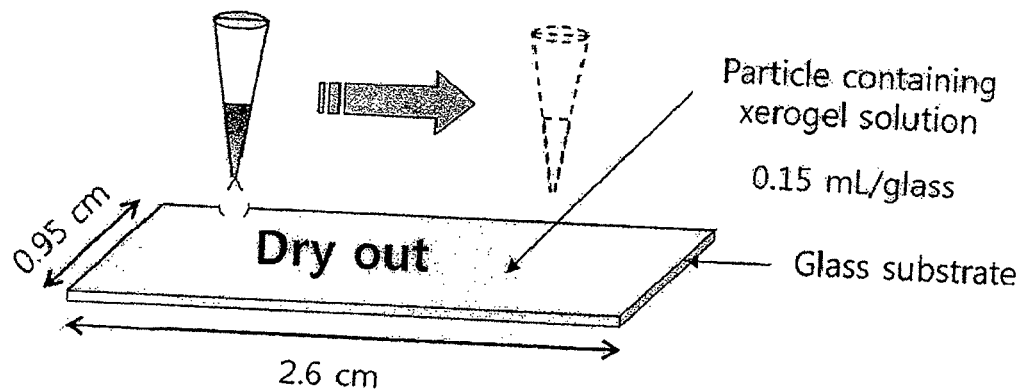
FIG. 8 depicts cast coating of the superhydrophobic xerogel solution onto a substrate.
Figure 9:
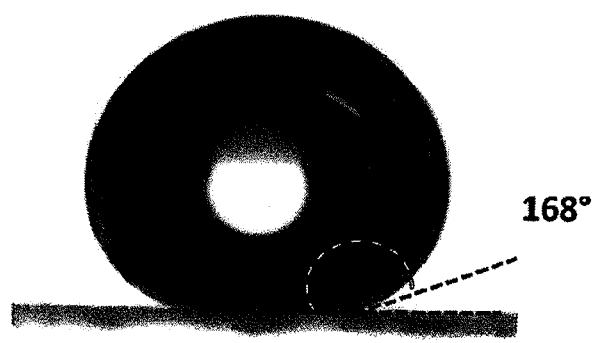
FIG. 9 depicts the measurement of the static water contact angle of a coating as described herein.
Figure 10:
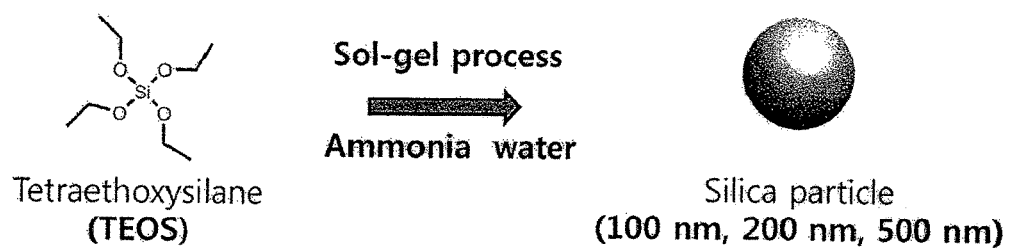
FIG. 10 depicts a method for preparing silica nanoparticles of varying sizes that can be dispersed in a fluorinated gel as described herein.
Figure 11:
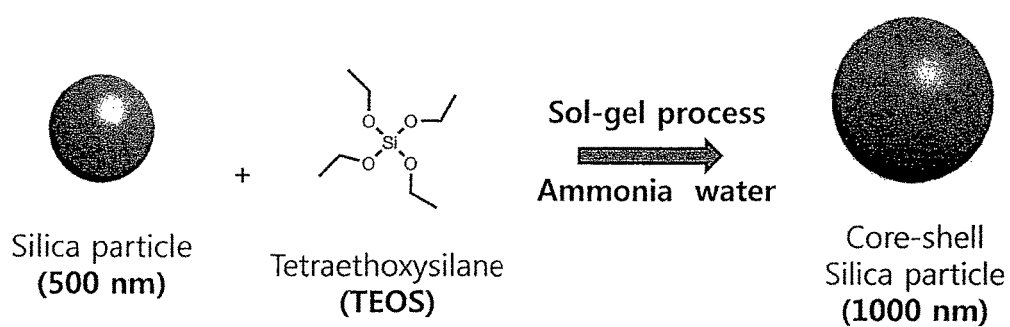
FIG. 11 depicts a method for preparing 1000 nm silica nanoparticles that can be dispersed in a fluorinated gel as described herein.
Figure 14:
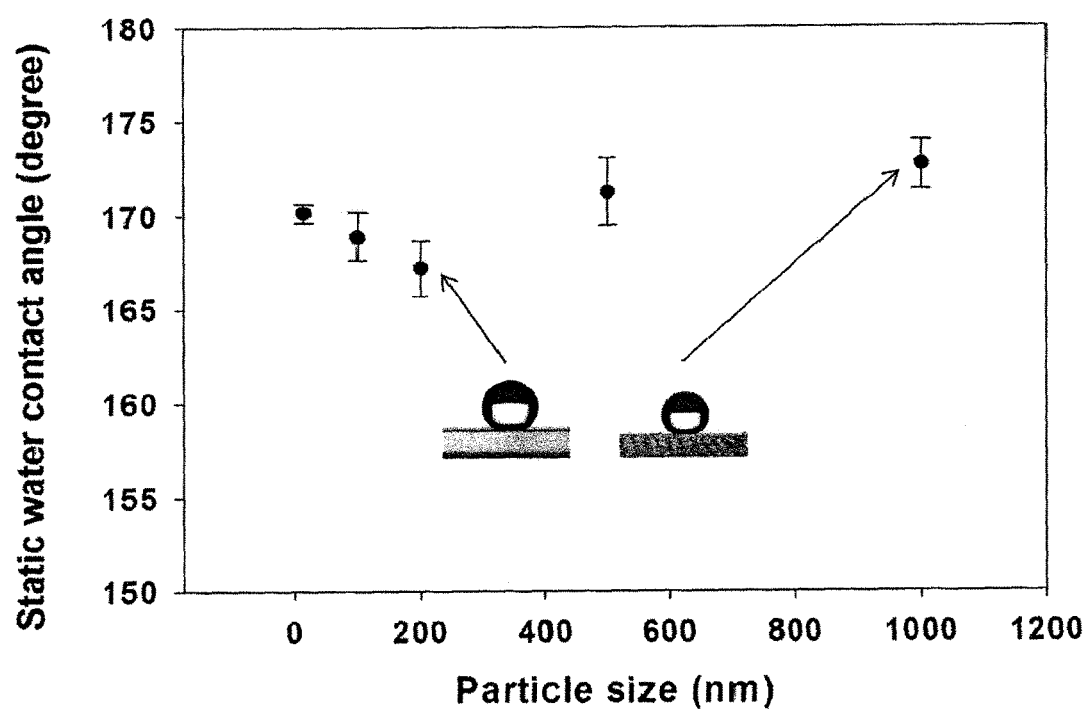
FIG. 14 depicts a plot of the static water contact angle measurement (degrees) and particle size. Regardless of particle size, superhydrophobic coatings were formed. The particles themselves did not require a fluoroalkoxysilane. The gel does contain a fluoroalkoxysilane. In this example, it contains FTMS.

Adhesion of *S. aureus* and *P. aeruginosa* to superhydrophobic SC-30-FM substrates was reduced by 2.08 log (99.0%) and 1.76 log (98.2%) versus 100% MTMOS controls, respectively. For silica colloid-coated substrates lacking the 17-FTMS modification, the reduction in *S. aureus* and *P. aeruginosa* adhesion vs. 100% MTMOS controls were an order of magnitude less at 1.06 and 1.10 log, respectively. No significant difference in bacterial adhesion to hydrophobic 30-FM substrates versus 100% MTMOS substrates was observed. While these results suggest that the surface roughness of the silica colloid coating alone can significantly reduce bacterial adhesion, maximum resistance is achieved in combination with the 17-FTMS modification. Notably, smooth low surface energy surfaces (17-FTMS alone) were not effective at repelling bacterial adhesion compared to 100% MTMOS surfaces. See, FIG. 5.

As used herein, "about" means within a statistically meaningful range of a value such as a stated concentration range, time frame, molecular weight, volume, temperature or pH. Such a range can be within an order of magnitude, typically within 20%, more typically still within 10%, and even more typically within 5% of a given value or range. The allowable variation encompassed by "about" will depend upon the particular system under study, and can be readily appreciated by one of skill in the art.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, it will be obvious that certain changes and modifications may be practiced within the scope of the appended claims.

That which is claimed:

1. A method of preparing a coating, comprising:
   a) contacting at room temperature, not including any heat generated by the contacting itself, a silica-containing colloid with two or more silanes to prepare a first colloid mixture, wherein one of the silanes is methyltrimethoxysilane (MTMOS) and at least one of the silanes is a fluoroalkoxysilane,
   b) contacting at room temperature, not including any heat generated by the contacting itself, said first colloid mixture with an acid, wherein a superhydrophobic coating is prepared;
   wherein no heat, besides any heat generated by the contacting, is added in either step a) or step b); and
   wherein said MTMOS is present in a molar excess amount relative to said fluoroalkoxysilane.

2. The method of claim 1, wherein said colloid comprises silica nanoparticles.

3. The method of claim 1, wherein said fluoroalkoxysilane is (heptadecafluoro-1,1,2,2-tetrahydrodecyl)trimethoxysilane.

4. The method of claim 1, wherein at least one of said silanes is a backbone silane selected from the group consisting of butyltrimethoxysilane (BTMOS), tetramethylorthosilicate (TMOS), tetraethylorthosilicate (TEOS) or their combinations thereof.

5. The method of claim 1, further comprising:
   c) contacting the product of said b) with a solid substrate, wherein no plasma etching, chemical etching, or chemical vapor deposition is performed.

6. The method of claim 5, wherein said solid substrate is selected from the group consisting of medical devices, plumbing fixtures, condenser coils, optical surfaces, boat hulls and aircraft.

7. The method of claim 5, wherein said contacting comprises spray coating.

8. A method of reducing microbial adhesion, condensation or ice buildup, comprising:
   contacting the coating prepared according to claim 1 with a solid substrate, wherein no plasma etching, chemical etching, or chemical vapor deposition is performed.

9. The method of claim 8, wherein said microbial adhesion is a bacterial adhesion.

10. The method of claim 8, wherein said microbial adhesion is a fungal adhesion.

11. The method of claim 10, wherein said fungal adhesion comprises an adhesion of a *Candida* species.

12. The method of claim 8, wherein said contacting comprises spray coating.

13. A method of coating a substrate comprising:
    contacting said substrate at room temperature by spray coating a composition comprising, nanostructured fluorinated silica colloids, and a fluoroalkoxysilane covalently linked to at least one additional backbone silane to prepare a coated substrate;
    wherein said additional backbone silane is methyltrimethoxysilane (MTMOS);
    wherein no heat, besides any heat generated by the contacting, is added during the spray coating; and
    wherein no plasma etching, chemical etching, or chemical vapor deposition is performed during the spray coating.

* * * * *

UNITED STATES PATENT AND TRADEMARK OFFICE
CERTIFICATE OF CORRECTION

PATENT NO. : 9,675,994 B2  
APPLICATION NO. : 14/122378  
DATED : June 13, 2017  
INVENTOR(S) : Mark H. Schoenfisch et al.

Page 1 of 1

It is certified that error appears in the above-identified patent and that said Letters Patent is hereby corrected as shown below:

In the Specification

At Column 1, Lines 18-21, under the heading "STATEMENT REGARDING FEDERALLY SPONSORED RESEARCH OR DEVELOPMENT":
Delete the text "This invention was made with United States government support awarded by the National Institutes of Health under grant no. 5-R01-EB000708-06-08. The United States government has certain rights in this invention." and replace it with:
--This invention was made with government support under Grant Number EB000708 awarded by the National Institutes of Health. The government has certain rights in the invention.--

Signed and Sealed this  
Twenty-second Day of October, 2019

Andrei Iancu  
*Director of the United States Patent and Trademark Office*